United States Patent Office 3,281,310
Patented Oct. 25, 1966

3,281,310
ADHERING TEXTILE MATERIALS TO RUBBER
Arthur C. Danielson, Royal Oak, Mich., assignor to United States Rubber Company, New York, N.Y., a corporation of New Jersey
No Drawing. Filed Oct. 19, 1964, Ser. No. 404,917
11 Claims. (Cl. 161—227)

This application is a continuation-in-part of my application Serial No. 196,453, filed May 21, 1962, which is a continuaiton-in-part of my application Serial No. 144,311, filed October 11, 1961, both of said applications now abandoned.

This invention relates to improvements in the method of adhering textile materials to rubber, and to the improved laminates so obtained.

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent early failure.

According to the present invention, there is provided an improved method for adhering textile material to rubber, for example in adhering the plies of tire cord fabric ot the tire carcass stock.

In carrying out the present invention, adhesion of the textile material to the adjacent rubber layer is greatly improved by incorporating in the rubber layer an "Ingredient A" which is a 1,3-oxazolidine, a bis(1,3-oxazolidino) methane, an octahydro-1,3-benzoxazole, a tetrahydro-1,3-oxazine, a dialkylaminomethyl alkyl ether, or a diallylaminomethyl alkyl ether, and an "Ingredient B" which is resorcinol or other meta disubstituted benzene in which each of the substituents is an OH, $NH_2$ or $OCOCH_3$ radical, e.g., m-aminophenol, m-phenylene-diamine, resorcinol monoacetate, resorcinol diacetate, or 1,5-naphthalenediol, or partially reacted resorcinol-formaldehyde resin, which materials are equivalent to the resorcinol. The rubber intermediate the textile plies may be applied in the usual manner by calendering a coating of a vulcanizable rubber composition on the textile material, generally on both sides e.g. as in the conventional coating of tire cord fabric with tire carcass stock. The textile material, such as tire cord fabric, may optionally previously have applied thereto a thin coating of rubber by passing the textile material through a bath of an aqueous dispersion of rubber, such as rubber latex, and drying. This so-called "solutioning" treatment is common practice. The "Ingredient A" and "Ingredient B" may be mixed with the compounding ingredients in the solid rubber to be calendered on the textile material. The rubber compound may then be calendered onto the bare or latex treated textile material. The amount of "Ingredient A" and "Ingredient B" mixed with the rubber is not critical. Generally, 0.5 to 8 parts, and preferably 1 to 4 parts of "Ingredient A" and "Ingredient B" (total) per 100 parts of the rubber will be mixed in the rubber compound to be calendered on the textile material. The ratio of "Ingredient A" to "Ingredient B" is not critical and generally will be from 1 to 4 moles, preferably 1 to 2 moles, of the resorcinol or other "Ingredient B" per mole of "Ingredient A." After building the rubber-coated textile material into the finished article, e.g. a tire, the assembly is heated to vulcanize the rubber components thereof. The adhesion of the textile material to the adjacent vulcanized rubber stock is greatly improved by incorporating in the rubber compound the "Ingredient A" and "Ingredient B."

The 1,3-oxazolidines that may be used have the general formula:

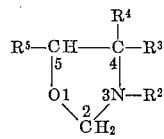

where $R^2$ is hydrogen, alkyl having 1 to 8 carbon atoms, hydroxyalkyl having 1 to 8 carbon atoms, benzyl or phenylcarbamyl, and $R^3$, $R^4$, and $R^5$ are hydrogens or alkyls having 1 to 8 carbon atoms. The 1,3-oxazolidines, except the 3-phenylcarbamyl-1,3-oxazolidines, are prepared as described in the paper "Some New Derivatives of Amino Hydroxy Compounds" by Murray Senkus, in Jour. Amer. Chem. Soc. 67, 1515–1519 (1945) by the reaction of one mole of paraformaldehyde, with one mole of a 2-aminoethanol. The 3-phenylcarbamyl-1,3-oxazolidines may be prepared by reacting the selected 1,3-oxazolidine where $R^2$ in the above general formula is hydrogen with phenylisocyanate. The following is illustrative:

PREPARATION OF 4,4-DIMETHYL-1,3-OXAZOLIDINE

To one mole of 2-methyl-2-amino-1-propanol in a round bottom flask is added in small portions 1.05 mole of paraformaldehyde. Continuous agitation is maintained with occasional cooling under cold water, until the paraformaldehyde has dissolved. The clear solution is allowed to stand overnight before adding 10–15 g. of solid potassium hydroxide. The oxazolidine (top layer) is separated and distilled. The fraction boiling at 126–130° C. is collected. N, calculated 13.9%, found 13.6%.

PREPARATION OF 3-PHENYLCARBAMYL-4,4-DIMETHYL-1,3-OXAZOLIDINE

Thirty grams of phenylisocyanate are added dropwise with stirring to 26 g. of 4,4-dimethyloxazolidine in toluene. The mixture is refluxed 30 minutes. Upon cooling white crystals appear which are filtered on a Buchner funnel and washed with a 50/50 toluene-heptane. Yield, 45 g. (82%). M.P., 130–132° C. N, calculated 12.7%, found 12.8%.

The bis(1,3-oxazolidino) methanes are prepared by reacting two moles of the selected 1,3-oxazolidine where $R^2$ in the above general formula is hydrogen with one mole of paraformaldehyde to give compounds having the general formula:

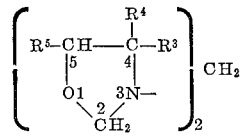

where $R^3$, $R^4$ and $R^5$ are the same as in the above general formula for the 1,3-oxazolidines. The following is illustrative:

PREPARATION OF BIS(4,4-DIMETHYL-1,3-OXAZOLIDINO) METHANE

To 101 g. of 4,4-dimethyloxazolidine in a 500 ml. round bottom flask is added, with stirring, 15 g. of powdered paraformaldehyde. The flask is stoppered and shaken gently for two hours during which time a slight warming occurs and the paraformaldehyde dissolves. Benzene is added to the flask fitted with a water trap and condenser, and this is refluxed 2½ hours with the collection of 9.8 ml. of water. Most of the remaining benzene is removed on a steam bath. The residue in the flask is vacuum distilled and the portion boiling between 117–121° C. at 10 mm. is collected. The yield is 67 g. (63%). N, calculated 13.1%, found 12.8%. Mol. wt., calculated 214, as determined by freezing point depresison, 207.

The octahydro-1,3-benzoxazoles are prepared by reacting one mole of paraformaldehyde with one mole of the selected 1-hydroxy-2-aminocyclohexane in a manner similar to the preparation of the 1,3-oxazolidines to give compounds having the general formula:

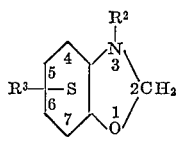

where $R^2$ is hydrogen, alkyl having 1 to 8 carbon atoms, hydroxyalkyl having 1 to 8 carbon atoms or benzyl, and $R^3$ is hydrogen, alkyl having 1 to 8 carbon atoms, vinyl or cyano. The "S" means that the ring is saturated. The following is illustrative:

PREPARATION OF N-n-BUTYL-5(6)-CYANO OCTAHYDRO-1,3-BENZOXAZOLE

To 33 g. of 1-hydroxy-2-n-butylamino-4(5)-cyano cyclohexane (prepared from 3,4-epoxycyclohexanecarbonitrile and n-butylamine, M.P. 82–84° C.) in 100 ml. of benzene is added 5 g. of powdered paraformaldehyde. The "5(6)-cyano" means the position of the cyano group is uncertain but is 5 or 6. The mixture is gently agitated for several hours during which time water of reaction separates. The benzene layer is dried over $K_2CO_3$ and the benzene removed on a steam bath. The fraction boiling (slight decomposition) at 161° C. at 7 mm. is collected. N, calculated 13.5%, found 12.8%.

PREPARATION OF N-n-BUTYL-5(6)-VINYL OCTAHYDRO-1,3-BENZOXAZOLE

To 51.5 g. of 1-hydroxy-2-n-butylamino-4(5)-vinyl cyclohexane (prepared from 1,2-epoxy-4-vinyl cyclohexane and n-butylamine, B.P. 136–139° C.) is added 7.9 g. of powdered paraformaldehyde. The "5(6)-vinyl" means the position of the vinyl group is uncertain but is 5 or 6. Upon gentle agitation water separates in a few hours. Benzene is added to the flask and the water layer separated. After drying the organic layer with $K_2CO_3$ the benzene is removed on a steam bath. The residue is not distilled. N, calculated 6.6%, found 6.8%.

The tetrahydro-1,3-oxazines are prepared in the manner of Kohn in Monatshefte 25, 835, by reacting one mole of paraformaldehyde (calculated as HCHO) with one mole of a 3-amino-propanol to give compounds having the general formula:

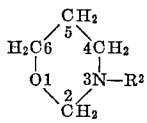

where $R_2$ is hydrogen, alkyl having 1 to 8 carbon atoms, or benzyl. The following is illustrative:

PREPARATION OF 3-n-BUTYL TETRAHYDRO-1,3-OXAZINE

To 39 g. of 3-n-butylaminopropanol (prepared from n-butylbromide and 3-aminopropanol; portion boiling between 93–102° C. at 9–10 mm.) is added 9 g. of powdered paraformaldehyde. The flask is gently agitated for several hours during which time the water of reaction separates. The water is removed with $K_2CO_3$. The dried material is distilled and the fraction boiling between 184–195° C. (some decomposition) is collected. N, calculated 9.8%, found 9.3%.

The dialklyaminomethyl alkyl ethers and diallyl-aminomethyl alkyl ethers are prepared as described in the paper "The Mechanism of Hydrolysis of Dialkylaminomethyl Ethers" by T. D. Stewart and W. E. Bradley, in Jour. Amer. Chem. Soc. 54, 4172–4183 (1932) by the reaction of one mole of a dialkylamine or diallylamine with one mole of paraformaldehyde and one mole of an aliphatic alcohol having 1 to 8 carbon atoms to give compounds having the general formula:

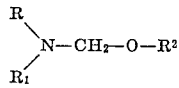

where R and $R^1$ are alkyl radicals having 1 to 8 carbon atoms or allyl, and $R^2$ is an alkyl radical having 1 to 8 carbon atoms. The following is illustrative:

PREPARATION OF DIISOPROPYLAMINOMETHYL ETHYL ETHER

To a mixture of 101 g. diisopropylamine and 80 g. ethanol is added slowly 30 g. of powdered paraformaldehyde. After standing half an hour 20 g. of $K_2CO_3$ is added. The organic layer is fractionally distilled and the portion boiling between 163 and 168° C. is collected. Yield is 35 g. (21%). N, calculated 8.8%, found 8.6%.

PREPARATION OF DIALLYLAMINOMETHYL ETHYL ETHER

To 97 g. of technical grade diallylamine and 80 g. of ethanol is added 30 g. of powdered paraformaldehyde in small portions. When all the formaldehyde has dissolved sufficient $K_2CO_3$ is added to dry the liquid. The fraction boiling between 163 and 165° C. is collected. The yield is 70 g. (45%). N, calculated 9.0%, found 9.3%.

The rubber used in the present invention for making the rubber and fabric laminates for use in tire manufacture and for other purposes may be natural (Hevea) rubber or conjugated diolefine polymer synthetic rubber or mixtures of any of them including their reclaims. Such conjugated diolefine polymer synthetic rubbers are polymers of butadienes-1,3, e.g. butadiene-1,3, isoprene, 2,3-dimethylbutadiene-1,3, and mixtures thereof and polymers of mixtures of such butadienes-1,3 with up to 50% of such mixtures of compounds which contain a $CH_2{=}C{<}$ group and which are copolymerizable with butadienes-1,3, e.g. where at least one of the disconnected valences is attached to an electronegative radical, that is a radical which increases the polar character of the molecule, such as vinyl, phenyl, nitrile, carboxy radicals. Examples of such conjugated diolefine polymer synthetic rubbers are polybutadiene, polyisoprene, butadiene-styrene copolymers (SBR) and butadiene-acrylonitrile copolymers. The rubber will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons), and synthetic linear polyamides (e.g. nylons), and may comprise cords or woven fabrics.

The following examples illustrate the invention. All parts referred to herein are by weight.

Example 1

Various rubber compounds were prepared by milling 1.25 parts of resorcinol into a masterbatch of 100 parts of natural rubber and 20 parts of carbon black at about 110° C. After cooling, the following ingredients were mixed into the batch at about 70° C. in the following order: 10 parts of zinc oxide, 2 parts of stearic acid, 0.5 part of accelerator SNS (N-tertiary-butyl-2-benzothiazole-sulfenamide), 1 part of antioxidant BLE (condensation product of acetone and diphenylamine), parts of the various "Ingredients A" as shown in the table below, and 3.5 parts of sulfur.

A control rubber compound was prepared in a similar manner except the resorcinol and "Ingredient A" were omitted.

The adhesion of the rubber compounds containing the resorcinol and the various "Ingredients A" according to the present invention and the control compound to tire cords made of bare nylon and rayon fibres was measured at 250° F. by the "H" adhesion test described in Ind. Rub. World, vol. 114, page 213 (1946) "Study of the 'H' Test for Evaluating the Adhesive Properties of Tire Cord in Natural and GR–S Rubbers," and in United States Department of Agriculture, Bulletin AIC–99 (1945) by Lyons, Nelson and Conrad. In the "H" test, the cord under test coated with the rubber compound under test is embedded in two separated standard rubber blocks and the assembly vulcanized. The pounds necessary to pull the adhered cord free of one of the rubber blocks is the "H" adhesion value. The higher the figure, the better the adhesion of the rubber coating to the cord. Test pieces for the rubber compounds were vulcanized for 30 minutes at 307° F. The results are shown in the following table:

| "Ingredient A" | Parts | 250° F. "H" adhesion (lbs.) | |
|---|---|---|---|
| | | To Nylon | To Rayon |
| 5-methyl-1,3-oxazolidine | 1.05 | 6.6 | 8.5 |
| 4-4-dimethyl-1,3-oxazolidine | 1.25 | 6.3 | 6.9 |
| 3,-(2-hydroxyethyl)-1,3-oxazolidine | 1.47 | 8.3 | 10.0 |
| 3-(2-hydroxypropyl)-5-methyl-1,3-oxazolidine | 1.80 | 8.7 | 8.0 |
| 3-ethyl-1,3-oxazolidine | 1.25 | 5.6 | 7.9 |
| 3-benzyl-1,3-oxazolidine | 2.05 | 8.0 | 11.5 |
| 3-cyclohexyl-5-methyl-1,3-oxazolidine | 2.10 | 8.3 | 10.3 |
| 3-tert-butyl-1,3-oxazolidine | 1.50 | 5.5 | 5.0 |
| 3-phenylcarbamyl-4,4-dimethyl-1,3-oxazolidine | 2.75 | 6.5 | 6.2 |
| 4,4-dimethyl-1,3-oxazolidine, stearate of | 3.50 | 5.4 | 4.8 |
| 4,4-dimethyl-1,3-oxazolidine, sebacate of | 2.58 | 5.7 | 5.8 |
| Control | | 4.7 | 3.0 |

NOTE.—The stearate and sebacate of 4,4-dimethyl-1,3-oxazolidine are prepared by mixing slightly more than an equivalent amount of 4,4-dimethyl-1,3-oxazolidine with the appropriate acid (stearic acid or sebacic acid) in ethyl alcohol. The alcohol and excess oxazolidine are evaporated on a steam bath. The salt remains as the residue with no odor of oxazolidine.

*Example 2*

Various rubber compounds were prepared by mixing 100 parts of natural rubber, 33 parts of carbon black, 1.25 parts of resorcinol, 10 parts of zinc oxide, 2 parts of stearic acid, 5 parts of pine tar-softener, 1.5 parts of antioxidant BLE, 0.4 part of accelerator SNS, parts of the various "Ingredients A" as shown in the table below, and 3.5 parts of sulfur.

A control rubber compound was prepared in a similar manner except the resorcinol and "Ingredient A" were omitted.

The adhesion of the rubber compounds containing the resin forming components according to the present invention and the control compound to tire cords made of bare nylon and rayon fibres was measured at 250° F. by the "H" adhesion test. The test pieces were vulcanized for 30 minutes at 307° F. The results are shown in the following table.

| "Ingredient A" | Parts | 250° F. "H" adhesion (lbs.) | |
|---|---|---|---|
| | | To Nylon | To Rayon |
| Bis(4,4-dimethyl-1,3-oxazolidino) methane | 0.85 | 12.4 | 10.4 |
| N-n-butyl-5(6)-cyano octahydro-1,3-benzoxazole | 2.60 | 5.5 | 4.9 |
| N-n-butyl-5(6)-vinyl octahydro-1,3-benzoxazole | 2.60 | 7.2 | 4.7 |
| 3-n-butyl tetrahydro-1,3-oxazine | 2.00 | 6.0 | 4.3 |
| Diethylaminomethyl n-butyl ether | 2.00 | 12.4 | 8.1 |
| Diethylaminomethyl sec.-butyl ether | 2.00 | 11.3 | 7.7 |
| Diallylaminomethyl ethyl ether | 1.95 | 15.5 | 9.6 |
| Diisopropylaminomethyl ethyl ether | 2.00 | 7.1 | 5.6 |
| Control | | 3.3 | 2.0 |

*Example 3*

A rubber compound A was prepared by mixing 100 parts of natural rubber, 33 parts of carbon black, 1.25 parts of resorcinol, 10 parts of zinc oxide, 2 parts of stearic acid, 5 parts of pine tar softener, 1.5 parts of antioxidant BLE, 0.4 part of accelerator SNS, 1.25 parts of 4,4-dimethyl-1,3-oxazolidine and 3.5 parts of sulfur.

Rubber compound B was prepared in a similar manner to compound A except 2 parts of a commercial partially reacted resorcinol-formaldehyde resin were added instead of 1.25 parts of resorcinol.

Rubber compound C was prepared in a similar manner to compound A except 1.25 parts of m-aminophenol were added instead of 1.25 parts of resorcinol.

A control rubber compound was prepared in a similar manner to compound A except the resorcinol and 4,4-dimethyl-1,3 oxazolidine were omitted.

The adhesion of the rubber compounds A to C according to the present invention and the control compound to tire cords made of bare nylon and bare rayon fibers was measured at 250° F. by the "H" adhesion test. Test pieces were vulcanized for 45 minutes at 293° F. and for 30 minutes at 307° F. The results are shown in the following table:

| Compound | 250° "H" adhesion (lbs.) | | | |
|---|---|---|---|---|
| | To Nylon | | To Rayon | |
| | 293° F. Cure | 307° F. Cure | 293° F. Cure | 307° F. Cure |
| A | 6.7 | 5.8 | 6.1 | 5.6 |
| B | 9.9 | 9.0 | 7.4 | 7.9 |
| C | 9.2 | 8.6 | 8.6 | 8.1 |
| Control | 3.7 | 3.5 | 2.3 | 3.4 |

*Example 4*

A rubber compound A was prepared by mixing 100 parts of natural rubber, 33 parts of carbon black; 1.25 parts of resorcinol, 10 parts of zinc oxide, 2 parts of stearic acid, 5 parts of pine tar softener, 1.5 parts of antioxidant BLE, 0.4 part of accelerator SNS, 2 parts of 3-benzyl-1,3-oxazolidine, and 3.5 parts of sulfur.

Rubber compound B was prepared in a similar manner to compound A except 1.7 parts of resorcinol monoacetate were added instead of 1.25 parts of resorcinol.

Rubber compound C was prepared in a similar manner to compound A except 2.2 parts of resorcinol diacetate were added instead of 1.25 parts of resorcinol.

Rubber compound D was prepared in a similar manner to compound A except 1.25 parts of m-aminophenol were added instead of 1.25 parts of resorcinol.

Rubber compound E was prepared in a similar manner to compound A except 1.25 parts of m-phenylene diamine were added instead of 1.25 parts of resorcinol.

Rubber compound F was prepared in a similar manner to compound A except 2 parts of diethylaminomethyl sec.-butyl ether was added instead of 2 parts of 3-benzyl-1,3-oxazolidine.

Rubber compound G was prepared in a similar manner to compound A except 2 parts of diethylaminomethyl sec.-butyl ether was added instead of 2 parts of 3-benzyl-1,3-oxazolidine and 1.7 parts of resorcinol monoacetate were added instead of 1.25 parts of resorcinol.

A control rubber compound was prepared in a similar manner to compound A except the resorcinol and N-benzyl oxazolidine were omitted.

The adhesion of the rubber compounds A to G according to the present invention and the control compound to tire cords made of bare nylon and bare rayon fibers was measured at 250° F. by the "H" adhesion test. Test pieces were vulcanized for 45 minutes at 293° F., and for 30 minutes at 307° F., and for 20 minutes at 331° F. The control test pieces in the "H" adhesion test at the various cures showed 3 to 4 lbs. pull with the nylon cords and 2 to 3 lbs. pull with the rayon cords. The highest pulls of the three cures for compounds A to G are shown in the following table:

| Compound | 250° "H" adhesion (lbs.) | |
|---|---|---|
| | To Nylon | To Rayon |
| A | 12.0 | 11.7 |
| B | 17.0 | 14.0 |
| C | 7.8 | 9.5 |
| D | 7.2 | 6.8 |
| E | 4.4 | 9.8 |
| F | 17.1 | 14.9 |
| G | 16.2 | 13.9 |

*Example 5*

A rubber compound was prepared by mixing 100 parts of natural rubber, 28 parts of carbon black, 1.8 parts of 1,5-naphthalenediol, 18 parts of zinc oxide, 2 parts of stearic acid, 3 parts of pure tar softener, 1.5 parts of antioxidant BLE, 0.4 part of accelerator SNS, 1.8 parts of 3-benzyl-1,3-oxazolidine, and 3.5 parts of sulfur.

A control rubber compound was prepared in a similar manner except the 1,5-naphthalenediol and the 3-benzyl-1,3-oxazolidine were omitted.

The adhesion of the rubber compound containing the resin forming components according to the present invention and the control compound to tire cords made of bare nylon and bare rayon fibers was measured at 250° F. by the "H" adhesion test. The test pieces were vulcanized for 30 minutes at 307° F. The results are shown in the following table:

| | 250° F. "H" adhesion (lbs.) | |
|---|---|---|
| | To Nylon | To Rayon |
| Present invention | 10.1 | 5.1 |
| Control | 3.8 | 3.2 |

The results in Examples 1 to 5 clearly show the great improvement in adhesion of fibrous material to rubber by the present invention.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A laminate comprising a textile material layer and a vulcanized rubber layer, said vulcanized rubber layer being the reaction product of (1) natural Hevea rubber or a conjugated diolefin polymer synthetic rubber, (2) a first component selected from the group consisting of a 1,3-oxazolidine having the formula:

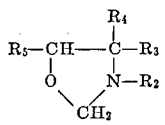

wherein $R_2$ is hydrogen, an alkyl group having from 1 to 8 carbon atoms, hydroxyalkyl having 1 to 8 carbon atoms, a benzyl group, or a phenylcarbamyl group and $R_3$, $R_4$ and $R_5$ are either hydrogen or an alkyl group having from 1 to 8 carbon atoms; a bis(1,3-oxazolidino)methane having the formula:

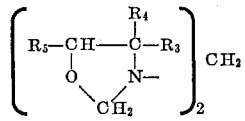

wherein $R_3$, $R_4$ and $R_5$ are hydrogen or an alkyl group having from 1 to 8 carbon atoms; an octahydro-1,3-benzoxazole having the formula:

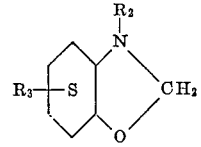

wherein $R_2$ is hydrogen, an alkyl group having from 1 to 8 carbon atoms, a hydroxyalkyl group having from 1 to 8 carbon atoms or a benzyl group and $R_3$ is hydrogen, an alkyl group having from 1 to 8 hydrogen atoms, a vinyl group, or a cyano group; a tetrahydro-1,3-oxazine having the formula:

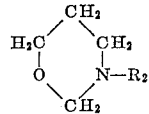

wherein $R_2$ is either hydrogen or an alkyl group having from 1 to 8 hydrogen atoms; a dialkylaminomethyl alkyl ether or a diallylaminomethyl alkyl ether, the alkyl groups in said ethers having from 1 to 8 carbon atoms; and (3) a second component selected from the group consisting of resorcinol, m-aminophenol, m-phenylene diamine, resorcinol monoacetate, resorcinol diacetate, 1,5-naphthalenediol and partially reacted resorcinol-formaldehyde resins and (4) a vulcanizing agent.

2. The laminate of claim 1 wherein said textile material is a tire cord fabric and said vulcanized rubber layer is a vulcanized rubber tire carcass stock.

3. The laminate of claim 1 wherein said textile material is a tire cord fabric, said vulcanized rubber layer is a vulcanized rubber tire carcass stock, said first component is a 1,3-oxazolidine and said second component is a partially reacted resorcinol-formaldehyde resin.

4. A method of adhering textile material to rubber which comprises applying a solid vulcanizable rubber composition comprising rubber selected from the group consisting of natural Hevea rubber and conjugated diolefin polymer synthetic rubbers which are polymers of material selected from the group consisting of butadiene-1,3-isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing a first component selected from the group consisting of a 1,3-oxazolidine having the formula:

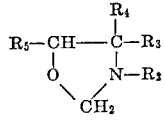

wherein R₂ is hydrogen, an alkyl group having from 1 to 8 carbon atoms, hydroxyalkyl having 1 to 8 carbon atoms, a benzyl group, or a phenylcarbamyl group and R₃, R₄ and R₅ are either hydrogen or an alkyl group having from 1 to 8 carbon atoms; a bis(1,3-oxazolidino)methane having the formula:

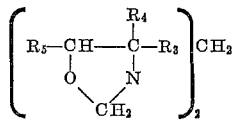

wherein R₃, R₄ and R₅ are hydrogen or an alkyl group having from 1 to 8 carbon atoms; and octahydro-1,3-benzoxazole having the formula:

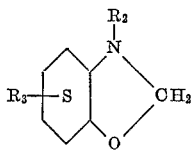

wherein R₂ is hydrogen, an alkyl group having from 1 to 8 carbon atoms, a hydroxyalkyl group having from 1 to 8 carbon atoms or a benzyl group and R₃ is hydrogen, an alkyl group having from 1 to 8 hydrogen atoms, a vinyl group, or a cyano group; a tetrahydro-1,3-oxazine having the formula:

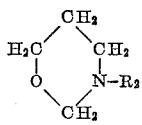

wherein R₂ is either hydrogen or an alkyl group having from 1 to 8 hydrogen atoms; a dialkylaminomethyl alkyl ether or a diallylaminomethyl alkyl ether, the alkyl groups in said ethers having from 1 to 8 carbon atoms; and a second component selected from the group consisting of resorcinol, m-aminophenol, m-phenylene diamine, resorcinol monoacetate, resorcinol diacetate, 1,5-naphthalenediol and partially reacted resorcinolformaldehyde resins, to a textile material selected from the group consisting of cotton, rayon and nylon to coat the same, and heating the assembly to vulcanize the rubber and to firmly adhere the textile material to the vulcanized rubber composition.

5. The method of claim 4 wherein said textile material is a tire cord fabric and said rubber is a tire carcass stock.

6. The method of claim 4 wherein said textile material is a tire cord fabric, said rubber is a tire carcass stock, said first component is a 1,3-oxazolidine and said second component is a partially reacted resorcinol-formaldehyde resin.

7. A solid vulcanizable rubber composition, said rubber being natural Hevea rubber or a conjugated diolefin polymer synthetic rubber, containing a first component selected from the group consisting of a 1,3-oxazolidine having the formula:

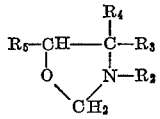

wherein R₂ is hydrogen, an alkyl group having from 1 to 8 carbon atoms, hydroxyalkyl having 1 to 8 carbon atoms, a benzyl group, or a phenylcarbamyl group and R₃, R₄ and R₅ are either hydrogen or an alkyl group having from 1 to 8 carbon atoms; a bis(1,3-oxazolidino) methane having the formula:

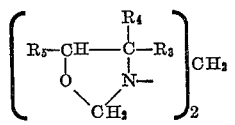

wherein R₃, R₄ and R₅ are hydrogen or an alkyl group having from 1 to 8 carbon atoms; an octahydro-1,3-benzoxazole having the formula:

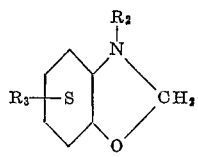

wherein R₂ is hydrogen, an alkyl group having from 1 to 8 carbon atoms, a hydroxyalkyl group having from 1 to 8 carbon atoms or a benzyl group and R₃ is hydrogen, an alkyl group having from 1 to 8 hydrogen atoms, a vinyl group, or a cyano group; a tetrahydro-1,3-oxazine having the formula:

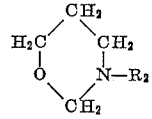

wherein R₂ is either hydrogen or an alkyl group having from 1 to 8 hydrogen atoms; a dialkylaminomethyl alkyl ether or a diallylaminomethyl alkyl ether, the alkyl groups in said ethers having from 1 to 8 carbon atoms; and a second component selected from the group consisting of resorcinol, m-aminophenol, m-phenylene diamine, resorcinol monoacetate, resorcinol diacetate, 1,5-naphthalenediol and partially reacted resorcinol-formaldehyde resins.

8. The composition of claim 7 wherein said first component is 3-benzyl-1,3-oxazoline and said second component is resorcinol or 1,5-naphthalenediol.

9. The composition of claim 7 wherein said first component is diethylaminomethyl sec.-butyl ether and said second component is resorcinol.

10. The composition of claim 7 wherein said first component is diallylaminomethyl ethyl ether and said second component is resorcinol.

11. The solid vulcanizable rubber composition of claim 7 wherein said first component is a 1,3-oxazolidine and said second component is a partially reacted resorcinol-formaldehyde resin.

References Cited by the Examiner

UNITED STATES PATENTS

| | | | |
|---|---|---|---|
| 2,103,686 | 12/1937 | Martin | 260—804 |
| 2,291,208 | 7/1942 | Brown et al. | 161—92 |
| 2,817,663 | 12/1957 | Conlon et al. | 260—32.4 XR |
| 2,911,294 | 11/1959 | Eden | 260—244 XR |

FOREIGN PATENTS 471,900  3/1951  Canada.

OTHER REFERENCES

Senkus: "Some New Derivatives of Amino Hydroxy Compounds," Journal of American Chemistry Society, vol. 67, pp. 1515–1519 (1945) (p. 1517 relied on), QD 1A5.

Wakeman: The Chemistry of Commercial Plastics, N.Y., Reinhold Pub. Corp. (1947), TP 986.A2 W3 (pp. 117–119 relied on).

Wertheim: Textbook of Organic Chemistry, N.Y., McGraw-Hill Book Co., Third Edition (1951), pp. 168 and 464 relied on.

ALEXANDER WYMAN, *Primary Examiner.*

G. D. MORRIS, *Assistant Examiner.*